J. M. Long.
Pitman.
Nº 38,233.  Patented April 21, 1863.
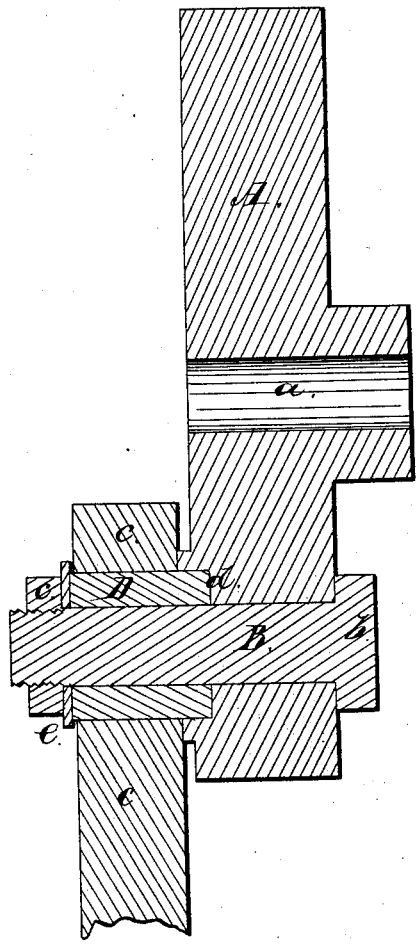
Witnesses:
J. B. Elliott
Wm. H. Clark
Inventor:
John M. Long
by
Wm. Clough Atty.

UNITED STATES PATENT OFFICE.

JOHN M. LONG, OF HAMILTON, OHIO.

IMPROVEMENT IN CRANK-WRISTS.

Specification forming part of Letters Patent No. 38,233, dated April 21, 1863.

*To all whom it may concern:*

Be it known that I, JOHN M. LONG, of Hamilton, in the county of Butler and State of Ohio, have invented a new and useful Improvement in Crank-Wrists; and I do hereby declare the following to be a full, clear, and exact description thereof, reference being had to the accompanying drawing and letters of reference, making part of this specification.

My invention relates to the construction of the crank-wrist by which the pitman is connected with the crank; and it consists in the peculiar construction herein represented and described.

To enable others to make and use my invention, I will proceed to describe it minutely.

In the accompanying drawing, A represents the crank or crank-wheel, the same being shown on an axial plane. The crank-wrist and pitman are also shown in section upon the same plane.

*a* is the eye of the crank-wheel, which receives the driving-shaft.

B is a bolt of suitable dimensions—say, one-half inch in diameter—passing through the crank in the place of an ordinary fixed crank-wrist.

*b* is the head and *c* is the nut of the bolt.

C is the pitman.

D is a metal ferrule or sleeve, surrounding bolt B, as shown. This ferrule I prefer to cast in a "chill," by which the outer periphery is rendered extremely hard, after which it is polished smooth with emery.

Surrounding the aperture in A, through which bolt B passes, an annular space, *d*, is formed, and into this aperture the ferrule D enters a short distance, as shown, the ferrule closely fitting the aperture. A round hole through pitman C, near its end, allows the pitman to be slipped over ferrule or sleeve D. The latter is to fill the hole in pitman nicely, but not so as to prevent its rotating freely therein. A thin washer, *e*, surrounds the bolt B, and the nut *c*, when screwed up tightly, confines the ferrule D firmly in its place. As will be seen, the ferrule D, entering the recess *d* in the crank and confined by the bolt B, affords a large and secure crank-wrist of a very cheap and easy construction. When worn so as to become loose in the pitman, or if broken by accident, it can be readily removed and a new one substituted. Being comparatively inexpensive, the operator may always have extra ferrules or bolts, if necessary, at hand.

The bolt is of common construction; and the object of the invention is to provide a cheap, simple, and convenient substitute for the crank-wrists of ordinary construction, and to enable the operator to replace the wrist in case of accident without the delay and expense of sending frequently to a great distance to have the article made.

I do not claim making a crank-wrist simply with a ferrule over the pin; but

What I do claim as my invention is—

So making the wrist that the ferrule which covers the screw-bolt or pin B shall be let into the face of crank A and held in place by the screw-bolt B, substantially as and for the purpose set forth.

JOHN M. LONG.

Witnesses:
WM. CLOUGH,
GEO. K. STILLMAN.